United States Patent [19]

Kurkov et al.

[11] Patent Number: 5,218,057
[45] Date of Patent: Jun. 8, 1993

[54] ETHYLENE-ALKYL ACRYLATE COPOLYMER SAPONIFICATION PROCESS

[75] Inventors: Victor P. Kurkov, San Rafael, Calif.; Leslie P. Theard, Houston, Tex.

[73] Assignee: Chevron Research and Technology Company, San Francisco, Calif.

[21] Appl. No.: 727,773

[22] Filed: Jul. 10, 1991

[51] Int. Cl.$^5$ .................................................. C08F 8/00
[52] U.S. Cl. ................................ 525/369; 525/330.6; 525/367
[58] Field of Search ................................ 525/369, 367

[56] References Cited

U.S. PATENT DOCUMENTS

| | | | |
|---|---|---|---|
| 3,926,891 | 12/1975 | Gross et al. | 525/330.6 |
| 3,970,626 | 7/1976 | Hurst et al. | 525/330.6 |
| 4,638,034 | 1/1987 | McClain | 525/330.6 |

*Primary Examiner*—Bernard Lipman
*Attorney, Agent, or Firm*—R. J. Sheridan; T. G. DeJonghe

[57] ABSTRACT

Disclosed is a method for saponifying an ethylene-alkyl acrylate copolymer comprising mixing together an ethylene-alkyl acrylate copolymer and an aqueous solution of an inorganic alkali metal base at a temperature sufficient for saponification to take place and at which the ethylene-alkyl acrylate copolymer undergoes a phase change.

15 Claims, No Drawings

ETHYLENE-ALKYL ACRYLATE COPOLYMER SAPONIFICATION PROCESS

BACKGROUND OF THE INVENTION

The present invention relates to the saponification (caustic hydrolysis) of ethylene-alkyl acrylate copolymers.

The batch aqueous saponification of ethylene-alkyl acrylate copolymers is known. U.S. Pat. No. 3,970,626, issued Jul. 20, 1976 to Hurst et al., describes a process for saponifying an ethylene-methyl acrylate copolymer using excess NaOH in aqueous solution. However, the reaction requires long residence times, on the order of several hours. Also, if the saponified product is to be used in dry form, this process requires the separation of large amounts of water from the product.

European Patent Application 0 104 316, published Apr. 4, 1984, describes a method for forming ionic copolymer salts from low molecular weight copolymer acids formed from ethylene and an a,β-ethylenically unsaturated carboxylic acid and oxides of Group II metals. The copolymer acid and metal oxide are mixed at a temperature between the melting point of the copolymer acid and 20° C. above the melting point of the copolymer acid. While the metal oxide is added to the copolymer acid in dry form, water can be added to the reaction mixture to accelerate the reaction.

U.S. Pat. No. 4,638,034, issued Jan. 20, 1987 to McClain, discloses the preparation of ethylene-acrylic acid copolymers or salts thereof by first preparing an ethylene-alkyl acrylate copolymer, and saponifying such ethylene-alkyl acrylate copolymer in the molten state, in the absence of solvent or water other than by-product alkanol, with metal hydroxides to form alkanol and a salt, or an ionomer, of ethylene-acrylic acid copolymer.

U.S. Pat. No. 5,003,001, issued Mar. 26, 1991 to Hasenbein et al., discloses ionically crosslinked ethylene copolymers prepared by mixing a carboxyl-containing copolymer with an aqueous metal salt solution in the reaction zone of a twin-screw extruder and transferring the product to a devolatilization zone. While the ethylene copolymers are said to include copolymers of ethylene and an a,β-ethylenically unsaturated comonomer donating carboxyl groups, i.e. comonomers which are converted into carboxyl-containing comonomers during or after the polymerization by hydrolysis and/or pyrolysis, the only copolymer used in the examples is an ethylene-acrylic acid copolymer.

For a commercial operation, it is desirable to have a rapid and continuous process which utilizes conventional equipment, such as extruders and injection pumps. A process has now been discovered which permits the saponification of ethylene-alkyl acrylate copolymers to be carried out to a high conversion using conventional equipment.

SUMMARY OF THE INVENTION

In accordance with the present invention, there is provided a method for saponifying an ethylene-alkyl acrylate copolymer comprising mixing together an ethylene-alkyl acrylate copolymer and an aqueous solution of an inorganic alkali metal base at a temperature sufficient for the saponification to take place and at which the ethylene-alkyl acrylate copolymer undergoes a phase change.

There is further provided in accordance with the present invention, a process for saponifying an ethylene-alkyl acrylate copolymer comprising:

(a) adding and mixing molten ethylene-alkyl acrylate copolymer and an aqueous solution of an inorganic alkali metal base in a first reaction zone, under saponification conditions, to produce a partially saponified ethylene-alkyl acrylate copolymer product;

(b) sequentially passing said partially saponified copolymer product from said first reaction zone through a series of one or more reaction zones; and (c) mixing additional aqueous solution of an inorganic alkali metal base with said partially saponified product, under saponification conditions, in each successive reaction zone until the desired level of saponification is achieved.

Also provided in accordance with the present invention is a process for saponifying an ethylene-alkyl acrylate copolymer comprising:

(a) continuously adding and mixing molten ethylene-alkyl acrylate copolymer and an aqueous solution of an inorganic alkali metal base in a first reaction zone under saponification conditions;

(b) continuously passing the saponified reaction product from said first reaction zone into a second reaction zone; and (c) adding and mixing additional aqueous solution of an inorganic alkali metal base to said saponified reaction product in said second reaction zone.

The present invention also provides a continuous process for saponifying an ethylene-alkyl acrylate copolymer comprising:

(a) introducing the ethylene-alkyl acrylate copolymer into an inlet zone, and melting and mixing said ethylene-alkyl acrylate copolymer in said inlet zone;

(b) passing the molten ethylene-alkyl acrylate copolymer through an injection zone;

(c) injecting, under saponification conditions, an aqueous solution of an inorganic alkali metal base into the molten ethylene-alkyl acrylate copolymer as it passes through said injection zone until the ethylene-alkyl acrylate copolymer is at least partially saponified.

Also provided in accordance with the present invention is a continuous process for saponifying an ethylene-alkyl acrylate copolymer comprising:

(a) introducing the ethylene-alkyl acrylate copolymer into an inlet zone, and melting and mixing said ethylene-alkyl acrylate copolymer in said inlet zone;

(b) passing the molten ethylene-alkyl acrylate copolymer through at least two injection zones connected in series;

(c) injecting, under saponification conditions, a portion of an aqueous solution of an inorganic alkali metal base into the molten ethylene-alkyl acrylate copolymer as it passes through each injection zone until the portion of said solution at least partially saponifies said ethylene-alkyl acrylate copolymer.

Among other factors, the present invention is based on the discovery that when an ethylene-alkyl acrylate copolymer is saponified using an aqueous solution of an inorganic alkali metal base, the saponification results in high conversion of ester groups in the copolymer to alkali metal carboxylates due to good mixing of the reactants.

DETAILED DESCRIPTION OF PREFERRED EMBODIMENTS

As used herein, the term "ethylene-alkyl acrylate copolymers" refers to copolymers of ethylene and acrylic or methacrylic esters of linear, branched or cyclic alkanols having 1-28 carbon atoms. The ethylene-alkyl acrylate copolymers are exemplified by ethylene-methyl acrylate copolymers. The specific ethylene-alkyl acrylate copolymer employed in the process of the present invention is not critical and can include copolymers containing high weight percentages of alkyl acrylate or high weight percentages of ethylene. However, preferably, these copolymers contain from about 1–60 weight percent alkyl acrylate and from about 99–40 weight percent ethylene; and more preferably from about 5–40 weight percent alkyl acrylate and 95–60 weight percent ethylene. Suitable copolymers generally have a melt index of about 1.0 to about 1000; preferably from about 2 to 200; and more preferably from about 5 to 50. Additionally, suitable ethylene-alkyl acrylate copolymers can also contain stabilizers, such as UV stabilizers, anti-oxidants, coloring agents, etc., as well as minor amounts, i.e., 5% or less, of one or more saturated or unsaturated hydrocarbon components, such as propylene, butylene, hexa-1,4-diene, etc., provided that these additional components do not alter the basic properties of the copolymer. Suitable copolymers are commercially available. For example, a suitable copolymer containing about 80 weight percent ethylene and 20 weight percent methyl acrylate is available as PE-2207 from Chevron Chemical Company, San Francisco, Calif. The preparation of ethylene-methyl acrylate copolymers is disclosed in U.S. Pat. No. 3,350,372 which is incorporated herein by reference. Also included within the term "ethylene-alkyl acrylate copolymers" are ethylene-alkyl acrylate copolymers obtained by chemical modification of the base copolymer, e.g., chlorosulfonated, chlorinated, oxidized, etc., ethylene-alkyl acrylate copolymers.

The ethylene-alkyl acrylate copolymer is reacted with an aqueous solution of an inorganic alkali metal base. As used herein, the term "inorganic alkali metal base" refers to basic compounds which contain a metal from Group I of the Periodic Table as a cation, and an inorganic anion. For the purposes of this invention, a carbonate anion is considered to be inorganic. Examples of the inorganic alkali metal bases useful in this invention include, but are not limited to, alkali metal hydroxides (such as NaOH, KOH and LiOH), alkali metal oxides (such as $Na_2O$, $K_2O$ and $Li_2O$) and alkali metal carbonates (such as $Na_2CO_3$, $K_2CO_3$ and $Li_2CO_3$). It has been found that the saponification of the ethylene-alkyl acrylate copolymers of the present invention proceeds faster when the saponifying agent is an inorganic alkali metal base, as opposed to an alkaline earth base. This difference in reaction rate is not necessarily evident, however, when the copolymer is an ethylene-acrylic acid copolymer.

The concentration of the inorganic alkali metal base in the aqueous solution may vary considerably depending upon such factors as the reactivity of the particular inorganic alkali metal base and ethylene-alkyl acrylate copolymer employed, reaction conditions (such as temperature and pressure), the desired level of saponification to be achieved, and the like. In general, however, the concentration of the inorganic alkali metal base in the aqueous solution will range from about 5% by weight to its saturation point. Preferably, the concentration of the solution will be such that it is easily handled, so the concentration of the inorganic alkali metal base in the aqueous solution will preferably be from about 10% to about 40% by weight.

There are several advantages of using the aqueous solution of an inorganic alkali metal base in the process of the present invention. One advantage is that the solution can be pumped into the reactor (e.g., an extruder), thus allowing for greater ease of handling than if a solid alkali metal base were used. Another advantage of using the aqueous solution is that it allows better mixing of the alkali metal base with the ethylene-alkyl acrylate copolymer than when a solid alkali metal base is used. A third advantage is that additives, such as emulsifiers and catalysts (e.g., crown ethers and ethylene glycol polyethers), can be readily added to the reactor as part of the aqueous solution to speed the rate of reaction.

The saponification reaction should be carried out at relatively high temperatures so that the ethylene-alkyl acrylate copolymer will undergo a phase change. As used herein, the term "undergo a phase change" means that the ethylene-alkyl acrylate copolymer (which is a solid at room temperature) has been heated at least to the point where it is readily deformed. Generally, this will mean that the copolymer has been heated until it is converted to a molten or fluid state. In general, the reaction temperature may be from about 180° C. to about 300° C. Higher reaction temperatures may be used, though discoloration and/or degradation of the polymer may occur. Likewise, lower temperatures may be used, but these lower temperatures may require excessively long reaction times. Preferably, the reaction temperature will be from about 200° C. to about 280° C.

When the reaction is conducted in an extruder, it should be run so that the water from the aqueous solution of the inorganic alkali metal base is maintained in the liquid state until the saponification reaction is essentially complete Also, the residence time for the reaction mixture in the extruder will generally be about 0.1 to about 30 minutes, the particular residence time being chosen so that the desired level of saponification is achieved. Of course, the residence time may vary depending upon the particular reaction conditions employed, the reaction temperature, throughput, extruder RPM, and the like.

The products of the reaction are an alkanol (the alkyl group of which comes from the alkyl acrylate comonomer) and a terpolymer of ethylene, alkyl acrylate, and an alkali metal salt of (meth)acrylic acid, assuming, that is, that less than 100% of the alkyl acrylate is saponified. The degree of saponification can be varied, and is controlled by the amount of inorganic alkali metal base used. A desirable product contains from about 0.5 to about 3.0 wt % alkali metal. This can be achieved by starting with an ethylene-alkyl acrylate copolymer containing 20% alkyl acrylate and saponifying from about 10 to about 60% of the alkyl acrylate units. The resulting terpolymer has some remaining ester groups, which desirably function as a plasticizer. The preferred product contains from about 0.5 to about 2.0 wt % alkali metal. While the alkali metal content can be higher than this, when the alkali metal content in the product becomes too high, the polymer becomes too viscous for normal processing.

After reaction completion, any water and by-product alkanol remaining in the reaction product can be removed by devolatilization. Also, any unreacted inorganic alkali metal base remaining in the reaction product will usually be neutralized.

It may be desirable to further treat the saponified product to produce a quatra-polymer of ethylene, alkyl acrylate, alkali metal salt of (meth)acrylic acid, and (meth)acrylic acid. This can be accomplished by adding a desired amount of an acid to the saponification product. Non-oxidizing acids are preferred. These include phosphoric acid and hydrochloric acid. Other acids, especially organic acids such as stearic acid, can also be used. If inorganic salts are formed, they are generally washed out of the polymer. Long chain organic acid salts, however, can be left in the product, since they can serve as a processing aid. The process of this invention can be conducted in any suitable mixing device such as a Brabender Plasticorder, a roll mill, a single or multiple screw extruder or any other of the well-known mechanical mixing equipment normally used in the mixing, compounding, processing or fabrication of low or high molecular weight thermoplastic, elastomeric or thermosetting polymers or mixtures thereof. An extruder having one or more ports is a particularly desirable reaction vessel, although it is by no means necessary insofar as the saponification reaction can be done in other reaction vessels. Suitable extruders are described in U.S. Pat. No. 4,857,600, issued Aug. 15, 1989 to Gross et al., which is incorporated by reference herein.

The aqueous solution of inorganic alkali metal base is generally added continuously or in several portions over a period of time to promote homogeneous distribution of the alkali metal acrylate groups throughout the mass of the polymer.

An extruder containing an entry port for the addition of the polymer, one or more reduced pressure zones with injection orifices at points where the polymer is molten for addition of the aqueous solution of inorganic alkali metal base, and a reduced pressure zone for venting off any volatiles formed during the process, may be used advantageously in the practice of this invention. In this case, the extrudate may be removed as ribbon or rod and cut into pellets, or pelletized under water.

The use of an extruder is especially desirable in the practice of this invention, since it readily permits one to employ different methods of adding the aqueous solution of the inorganic alkali metal base to the ethylene-alkyl acrylate copolymer. Thus, the solution can all be added to a first mixing zone in the extruder, or a portion of the solution can be added to the extruder at a first mixing zone with the balance added at a subsequent mixing zone or zones.

The following examples illustrate the present invention.

EXAMPLE 1

SAPONIFICATION OF ETHYLENE-METHYL ACRYLATE COPOLYMER IN AN AUTOCLAVE

A 300 cc Monel Autoclaves Engineers stirred autoclave equipped with a 50 ml Monel blow case for liquid injection, a gas inlet, a vent bursting disc and a pressure gauge was charged with 47 g of ethylene methyl acrylate copolymer ("EMAC"), melt index (MI)=20 g/10 min., 20 wt % methyl acrylate ("MA").

The autoclave was flushed with $N_2$ twice and then heated with an electric heater to 289° C. melt temperature (329° C. skin temperature). The blow case was charged with 2.24 g of 50% aqueous NaOH solution (0.028 moles), flushed with $N_2$ and pressured to 500 psig with $N_2$.

When the melt temperature reached 289° C., the NaOH solution was injected into the autoclave. The reaction time of 30 minutes was measured from this moment. The reaction was stopped by cooling in cold water. After the autoclave was cooled to room temperature and vented, the product was removed and divided into two parts. Each of these was washed separately with about 180 ml of $H_2O$ in the autoclave at about 180–200° C. The washed product was cryogenically ground and dried in a vacuum oven at 65° C. overnight.

The resulting product had a Melt Index of 1.27 g/10 min. and a percent Na (by Inductively Coupled Plasma) of 0.642 wt %.

CALCULATION OF PERCENT CONVERSION

The percent conversion of methyl acrylate comonomer to sodium acrylate was calculated for Example 1 as follows:

a) $\% \text{ Conversion} = \frac{0.642}{5.24} \times \frac{1}{.257} \times 100 = 47.7\%$ of theoretical based on NaOH.

b) 100% Conversion = 20 × 0.257 = 5.1% of MA initially present.

c) 5.1 × 477 = 2.45% of MA in EMAC was hydrolyzed.

d) % of EMAC Hydrolyzed = 2.45/20 = 12.3%

EXAMPLE 2

CONTINUOUS SAPONIFICATION OF EMAC IN A KOMAX STATIC MIXER

This experiment is similar to results expected in a reactive extruder.

A Komax Static Mixer (length=24.3 inch and diameter=1 inch) was attached to a ¾ inch single screw Haake Rheocord extruder. The static mixer was equipped with a liquid injection port and a strand die. A 25% aqueous solution of NaOH was pumped into the Komax mixer by liquid chromatography pump. Attached to the Komax was a cooling belt with air cooling and a pelletizer. This mixer was made of stainless steel; however, it is much preferred from a safety and corrosion point of view to use high nickel alloys such as Inconel and Monel. EMAC was fed into the extruder, which melts and pumps the polymer through the static mixer.

The extruder temperatures were: Feed section—250° C.; Metering section—280° C.; Komax mixer—290° C. The 25% aqueous NaOH solution was pumped into the mixer, where it was contacted with the molten polymer. Saponification takes place in the static mixer. The product terpolymer was extruded into a strand, which was cooled with air on a conveyer belt and pelletized.

Results are shown in Tables I and II. The values for the percent conversion in these tables was measured by the Inductively Coupled Plasma ("ICP") method based on incorporated sodium.

TABLE I
EFFECT OF RPM ON CAUSTIC HYDROLYSIS OF EMAC IN KOMAX MIXER

| RPM | FEED RATE (g/min) EMAC | NaOH Sol'n | NaOH MA | RESD.t, min | % HYDROL. ICP | % CONV. | MI[1] |
|---|---|---|---|---|---|---|---|
| 05 | 3.1 | 0.38 | 0.3 | 58.4 | 6.8 | 20.7 | 10.9 |
| 10 | 7.0 | 0.63 | 0.24 | 25.8 | 6.6 | 27.5 | 10.6 |
| 20 | 10.2 | 0.89 | 0.24 | 17.7 | 8.8 | 36.7 | 6.8 |
| 30 | 15.3 | 1.42 | 0.24 | 11.8 | 8.7 | 34.8 | 8.6 |
| 40 | 20.3 | 1.88 | 0.25 | 8.9 | 8.9 | 35.7 | 9.0 |

[1]Melt Index - g/10 min.

As can be seen in Table I, as the mixing (RPM) increased, the percent conversion increased, and reached a maximum at 20 RPM. The throughput could be increased by increasing RPM without adversely affecting the percent conversion.

TABLE II
EFFECT OF CAUSTIC ON CAUSTIC HYDROLYSIS OF EMAC IN KOMAX MIXER

| FEED RATE 25% NaOH g/min | FEED RATE EMAC g/min | RPM | NaOH ·MA | % HYDROL. by ICP | % CONV by ICP | MI |
|---|---|---|---|---|---|---|
| 0.9 | 10.2 | 20 | 0.24 | 8.8 | 36.7 | 6.8 |
| 1.5 | 10.2 | 20 | 0.40 | 11.6 | 29.0 | 6.4 |

As can be seen in Table II, increasing the amount of caustic gives increased percent hydrolysis.

EXAMPLE 3
CONTINUOUS SAPONIFICATION OF EMAC IN AN EXTRUDER

A Warner & Pfleiderer ZSK-30 corrosion resistant extruder was fitted with a liquid injection system. The liquid injection system consisted of a feed tank, metering pump, mass flowmeter, and an injection nozzle. The injection nozzle was placed in barrel #5 of the extruder. Downstream extruder equipment included a water cooling bath and a pelletizer.

The extruder was preheated to the following temperatures:

| ZONE | 1 | 2 | 3 | 4 | 5 | 6 | 7 |
|---|---|---|---|---|---|---|---|
| °C. | 230 | 275 | 275 | 275 | 275 | 240 | 205 |

The extruder was started up, followed by the solid feeder and the liquid feeder. EMAC containing 20 wt % methyl acrylate, and having a melt index of 20 was fed at 6 Kg/Hr, and was reacted in the extruder with an 8% aqueous sodium hydroxide solution fed at the rate of 1.68 Kg/Hr. The saponification reaction started in the injection zone and continued through the reaction zone. Excess water and by-product methanol were removed in a two stage devolatilization zone. The reaction product was extruded through a four strand die, cooled in a water bath and pelletized. The pellets were dried in a vacuum oven at 68° C. and 25 in. of mercury overnight. The resulting product was analyzed by titration to determine the extent of the reaction. The results are shown in Table III below.

Analytical procedure: A 10 g sample of the product was placed in a stainless steel autoclave, and 10 ml of glacial acetic acid and 200 ml of tetrahydrofuran (stabilized) were added. The mixture was stirred and heated at 150° C. for 30 minutes. The autoclave was then cooled, and the now homogeneous solution poured into a solution of 100 ml of methanol in 200 ml of water. The precipitate was filtered through a #4 filter and washed with water. The precipitate was dried in a vacuum oven at 70° C. and 25 in. of mercury overnight. A sample of the resulting product was dissolved in boiling tetrahydrofuran, and titrated with standard ethanolic KOH solution to thymol blue end point.

$$\% \text{ Conversion} = \frac{\text{meq/g acid in product}}{\text{meq/g NaOH fed}}$$

As can be seen from the data in Table III, saponification of EMAC via reaction in an extruder gave high conversion of ester groups due to good mixing of the reactants in the extruder. The effect of mixing is illustrated by comparing runs at 250 and 400 RPM where conversion went from 88% (at 250 RPM) to 99% (at 400 RPM). At 400 RPM and 6 Kg/Hr throughput, the average residence time is about 1.3 minutes.

TABLE III
REACTIVE EXTRUSION SAPONIFICATION

| EMAC Kg/Hr | 8% NaOH Kg/Hr | TEMP. °C. | RPM | CONV.[1] % | MI g/10 min. |
|---|---|---|---|---|---|
| 6 | 1.68 | 275 | 250 | 88.3 | 4.6 |
| 6 | 1.68 | 275 | 250 | 86.7 | 3.7 |
| 6 | 1.68 | 275 | 400 | 98.7 | 4.5 |

[1]100% Conversion = 24% hydrolysis

What is claimed is:

1. A method for saponifying an ethylene-alkyl acrylate copolymer comprising adding an aqueous solution of an inorganic alkali metal base to a molten ethylene-alkyl acrylate copolymer and mixing said alkali metal base and copolymer at a temperature sufficient for saponification to take place and at which the ethylene-alkyl acrylate copolymer remains in a molten or fluid state.

2. The method of claim 1 wherein the ethylene-alkyl acrylate copolymer is an ethylene-methyl acrylate copolymer.

3. The method of claim 1 wherein the alkali metal base is NaOH.

4. A process for saponifying an ethylene-alkyl acrylate copolymer comprising:
   (a) adding and mixing molten ethylene-alkyl acrylate copolymer and an aqueous solution of an inorganic alkali metal base in a first reaction zone, under saponification conditions, to produce a partially saponified ethylene-alkyl acrylate copolymer product;
   (b) sequentially passing said partially saponified copolymer product from said first reaction zone through a series of one or more reaction zones; and
   (c) mixing additional aqueous solution of an inorganic alkali metal base with said partially saponified product, under saponification conditions, in each successive reaction zone until the desired level of saponification is achieved.

5. The process of claim 4 wherein the ethylene-alkyl acrylate copolymer is an ethylene-methyl acrylate copolymer.

6. The process of claim 4 wherein the alkali metal base is NaOH.

7. A process for saponifying an ethylene-alkyl acrylate copolymer comprising:
   (a) continuously adding and mixing molten ethylene-alkyl acrylate copolymer and an aqueous solution of an inorganic alkali metal base in a first reaction zone under saponification conditions;
   (b) continuously passing the saponified reaction product from said first reaction zone into a second reaction zone; and
   (c) adding and mixing additional aqueous solution of an inorganic alkali metal base to said saponified reaction product ins aid second reaction zone.

8. The process of claim 7 wherein the ethylene-alkyl acrylate copolymer is an ethylene-methyl acrylate copolymer.

9. The process of claim 7 wherein the alkali metal base is NaOH.

10. A continuatou process for saponifying an ethylene-alkyl acrylate copolymer comprising:
    (a) introducing the ethylene-alkyl acrylate copolymer into an inlet zone, and melting and mixing said ethylene-alkyl acrylate copolymer in said inlet zone;
    (b) passing the molten ethylene-alkyl acrylate copolymer through an injection zone;
    (c) injecting, under saponification conditions, an aqueous solution of an inorganic alkali metal base into the molten ethylene-alkyl acrylate copolymer as it passes through said injection zone until the ethylene-alkyl copolymer is at least partially saponified.

11. The process of claim 10 wherein the ethylene-alkyl acrylate copolymer is an ethylene-methyl acrylate copolymer.

12. The process of claim 10 wherein the alkali metal base is NaOH.

13. A continuous process for saponifying an ethylene-alkyl acrylate copolymer comprising:
    (a) introducing the ethylene-alkyl acrylate copolymer into an inlet zone, and melting and mixing said ethylene-alkyl acrylate copolymer in said inlet zone;
    (b) passing the molten ethylene-alkyl acrylate copolymer through at least two injection zones connected in series;
    (c) injecting, under saponification conditions, a portion of an aqueous solution of an inorganic alkali metal base into the molten ethylene-alkyl acrylate copolymer as it passes through each injection zone until the portion of said solution at least partially saponifies said ethylene-alkyl acrylate copolymer.

14. The process of claim 13 wherein the ethylene-alkyl acrylate copolymer is an ethylene-methyl acrylate copolymer.

15. The process of claim 13 wherein the alkali metal base is NaOH.

* * * * *